Feb. 23, 1932.  R. N. TRANE  1,846,698
AUTOMATIC HEATING UNIT
Filed May 1, 1930
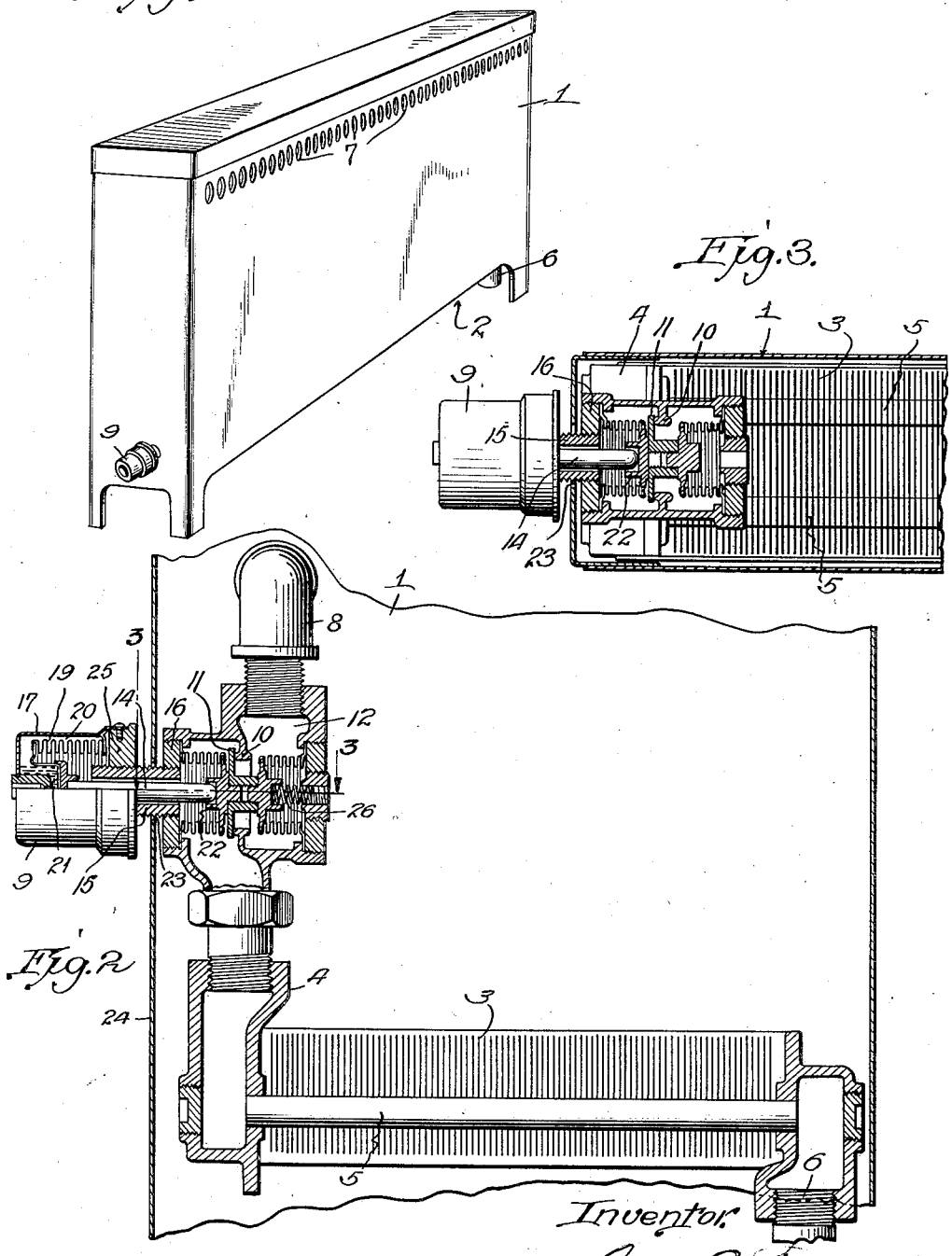
Inventor
Reuben R. Trane Patented Feb. 23, 1932

1,846,698

UNITED STATES PATENT OFFICE

REUBEN N. TRANE, OF LA CROSSE, WISCONSIN

AUTOMATIC HEATING UNIT

Application filed May 1, 1930. Serial No. 449,365.

My invention relates to an automatic heating unit wherein an automatic temperature control device is mounted on an air fin type radiator in connection with a convection casing, whereby the temperature control device is outside of the convection casing, and the radiator and valve controlled by the temperature regulator are inside of the convection casing.

In the past temperature regulators for individual radiators have failed to succeed where the thermostat was placed close beside or near the valve or the radiator because even though heat shields were used to prevent the heating of the thermostat by radiation from the valve and the radiator to the thermostat, nevertheless the thermostat became heated sufficiently to destroy the efficiency of the device. Also various other methods have been tried to prevent the thermostat from being heated by air currents rising either from the valve or the radiator and all have been more or less unsuccessful.

I have discovered a means whereby the automatic regulation of each individual radiator may be successful. The thermostat may be influenced by heat in four different ways, to-wit; it may be influenced by heated rising air currents, by radiation from the valve or the radiator itself, by conduction of heat by the connection between the thermostat and the valve, and, lastly, by the influence of the air surrounding the thermostat. It is desirable in an automatic controlled heating unit that the influence upon the thermostat by rising air currents, radiation and conduction be limited as far as possible. Therefore, one of the objects of my invention is to direct the heated air currents away from the thermostat, and I accomplish this by directing the heated air currents through a convection casing away from the thermostat.

Another object of my invention is to prevent the influence of radiated heat on the thermostat, and I accomplish this by the use of an air fin type radiator which, I have discovered, heats so almost entirely by convection that the convection casing is comparatively cool and particularly at the lower portion is very nearly the same temperature as the atmosphere nearby.

The air fin type radiator and casing which I use is described in my prior application, Serial #104,196, filed April 23, 1926, and patented May 12, 1931, as U. S. Patent No. 1,805,116, and in this type of radiator, the casing is comparatively cool although positioned close to the air fin type radiator. I have discovered that the air close by the convection casing far more closely approximates average room temperature than does the temperature near any cast iron radiator, so that another advantage of my invention is that the thermostat may be placed close to the operating valve without destroying the efficiency of the thermostat and at the same time keeping the thermostat susceptible to the influence of room temperature. To avoid the conduction of any heat from the valve itself, I prefer to use an insulated connection between the valve and the thermostat, and to avoid the conduction of any heat from the casing to the thermostat I have provided that the connection between the valve body and the thermostat project through the casing so that the casing is clear of the connection. By this means I have dispensed with the necessity of using heat shields between the valve and the thermostat composed of non-conducting material, which heat shields in the old device were necessarily attached either to the valve body or the thermostat, whereas by use of the casing, even though the casing be of metal and heat-conducting material, still there will be no influence of the heat inside the casing upon the thermostat located outside of the casing.

Another object of my invention is to provide a connection with the automatic temperature control device, a thermostatic member which exposes to the room atmosphere a metal shell instead of an aerated surface. In the former art cages have been used in closing corrugated thermostatic members which were ugly in appearance and the corrugations of which became the repository of dust, thereby impairing the efficiency of the thermostatic member, but I have discovered that by placing the thermostatic member outside of the casing that it is unnecessary to ventilate the thermostatic member but on the contrary a smooth cylindrical metal case may be used with the corrugated bellows on the interior of the metal shell.

The novel features of my invention are fully described in the following specification:

Fig. 1 is a perspective view of the casing surrounding the radiator and the thermostat extending through the wall of the casing.

Fig. 2 is a vertical sectional view with the casing broken away, showing the radiator, the thermostat extending out through the side of the casing and the valve construction.

Fig. 3 is a horizontal sectional view taken on the lines 3—3 of Fig. 2.

Referring to Fig. 1 and 2, the convection casing 1 is ordinarily a metal casing with an aperture 2 at the bottom of the casing for the entrance of air into the casing. This air passes by the fins 3 of the air fin type radiator, which is composed of the headers 4 connected by tubes 5 upon which are mounted the fins 3. The heating medium enters through the supply pipe 6 and passes through the radiator tubes to the opposite header, thence to a return pipe not shown. The air as it passes by the fins 3 is heated and rises by convection up through the convection casing 1 and is discharged through the apertures 7 of the convection casing. The flow of the heated air through the convection casing is so comparatively rapid that the lower portion of the convection casing is very cool and even at the top the casing is not hot to the touch.

In Fig. 2 the flow of heating medium through the radiator is regulated by the supply valve 8, which is operated by the automatic thermostatic element 9. The valve comprises the seat 10 and the throttle 11 controlling the flow of heating medium from the port 12 into the port 13. The throttle 11 is mounted on the valve stem 14 which is made of non-heat-conducting material and which extends from the throttle through the threaded boss 15, which is mounted on and detachably threaded into the bonnet 16, and also detachably threaded into the base plate 25. The threaded boss 15 is also made of slow-heat-conducting material.

The thermostatic member is mounted on the threaded boss 15 and is composed of a cup shaped metal casing 17 containing a bellows 19 and a volatile liquid 20 between the bellows 19 and casing 17. The valve stem 14 to the interior of the casing 17 actuates but is not attached to the end plate 21 of the bellows 19. The valve stem 14 moves in the sleeve 22 of the throttle 11 without being attached thereto, the throttle 11 tending to be moved in the opposite direction by the spring 26.

The connection between the thermostatic member and the valve passes through the aperture 23 of the side wall 24 of the convection casing 1. The aperture 23 is of small size and smaller than the diameter of the thermostatic member 9 but larger than the connection between the thermostatic member and the valve.

In the operation of the unit the air fin type radiator reduces to a minimum the influence of radiated heat upon the thermostatic member; the convection casing prevents the influence upon the thermostatic member of rising heated air currents from the valve or radiator while the insulated connections between the thermostatic member and the valve prevents the influence of conducted heat upon the thermostatic member so that the thermostatic member is influenced by the room atmosphere in the following manner. The metal shell or casing 17 influenced by the room atmosphere influences the volatile liquid in the space 20 causing movement of the bellows 19 and the valve stem 14 in such manner that the throttle 11 will open and close at predetermined temperatures, thus insuring a constant room temperature.

In installation the casing is positioned so that the aperture 23 is opposite the opening in the bonnet 16 on the interior of the casing and the thermostatic member is then attached to the valve body by screwing the boss 15 into the bonnet 16 and inserting the valve stem 14 into the sleeve 22, which is done by revolving the thermostatic member. It is also apparent that with this construction if the thermostatic member is turned sufficiently upon the threaded boss 15 the valve stem will cause the throttle 11 to seat, thereby acting as an ordinary regulator valve. The preferred position of the thermostatic member is near the lower portion of the casing as shown in Fig. 1, but frequently the fittings require that the valve be placed on the side of the casing and above the radiator but I have discovered that the heating of the convection casing has no effect on the thermostat in that position.

It will be understood that I desire to comprehend within my invention such modifications as may be necessary to adapt it to varying conditions and uses.

Having thus fully described my invention, what I claim as new and desire to secure by Letters Patent, is:

1. An automatically controlled heating unit, in combination an air fin type radiator within a convection casing which causes an air current through and away from the radiator, a valve within the casing controlling and supplying the heating medium to the radiator, a valve stem attached to the throttle of the valve and extending through and clear of the convection casing and attached to and actuated by a thermostatic member on the outside of the casing.

2. An automatically controlled heating unit, in combination an air fin type radiator within a convection casing which causes an air current through and away from the radiator, a valve within the casing controlling and supplying the heating medium to the radiator, a valve stem of non-heat-conducting material attached to the throttle of the valve and extending through and clear of the convection casing and attached to and actuated by a thermostatic member on the outside of the casing.

3. An automatically controlled heating unit, in combination an air fin type radiator within a convection casing which causes an air current through and away from the radiator, a valve within the casing controlling and supplying the heating medium to the radiator, an aperture in the casing, an actuator between the throttle of the valve and the thermostatic member composed of non-heat-conducting material, said actuator extending through the aperture in the casing and separated from the casing wall by non-heat-conducting material and thermostatic member attached to said actuator on the outside of the casing.

4. An automatically controlled heating unit, in combination an air fin type radiator within a convection casing which causes an air current through and away from the radiator, a valve within the casing controlling and supplying the heating medium to the radiator, a valve stem attached to the throttle of the valve and extending through and clear of the convection casing and attached to and actuated by a thermostatic member on the outside of the casing, an aperture in the convection casing smaller than the thermostatic member and larger than the connection between the thermostatic member and the valve body.

5. An automatically controlled heating unit, in combination an air fin type radiator within a convection casing which causes an air current through and away from the radiator, a valve within the casing controlling and supplying the heating medium to the radiator, a valve stem to actuate the throttle of the valve and extending through and clear of the convection casing and attached to and actuated by a thermostatic member on the outside of the casing, the thermostatic member being detachable and mountable on the valve body by threading the thermostatic member onto a boss mounted on the bonnet of the valve body and positioning the valve stem into the sleeve of the throttle of the valve by rotation of the thermostatic member.

6. An automatically controlled heating unit, in combination an air fin type radiator within a convection casing which causes an air current through and away from the radiator, a valve within the casing controlling and supplying the heating medium to the radiator, a valve stem attached to the throttle of the valve and extending through and clear of the convection casing and attached to and actuated by a thermostatic member on the outside of the casing, a threaded boss mounted on a bonnet of the valve body and extending through an aperture in the wall of the convection casing, and a thermostatic member detachably mounted on said boss.

7. An automatically controlled heating unit, in combination, an air fin type radiator within a convection casing which causes an air current through and away from the radiator, a valve within the casing controlling and supplying the heating medium to the radiator, thermostatic means mounted outside of and proximate to a thin convection casing wall and out of the path of the air currents within said radiator so that said thermostatic means is responsive to the temperature outside the said convection casing, said thermostatic means actuating said valve by means extending through said casing wall.

8. An automatically controlled heating unit, in combination, an air fin type radiator within a convection casing which causes an air current through and away from the radiator, a valve within the casing controlling and supplying the heating medium to the radiator, thermostatic means mounted outside of and proximate to a thin convection casing wall and out of the path of the air currents within said radiator so that said thermostatic means is responsive to the temperature outside the said convection casing, said thermostatic means actuating said valve by means extending through and clear of said casing wall.

9. An automatically controlled heating unit, in combination, an air fin type radiator within a convection casing which causes an air current through and away from the radiator, a valve within the casing controlling and supplying the heating medium to the radiator, thermostatic means mounted outside of and proximate to an uninsulated convection casing wall and out of the path of the air currents within said radiator so that said thermostatic means is responsive to the temperature outside the said convection casing, said thermostatic means actuating said valve by means extending through said casing wall.

10. An automatically controlled heating unit, in combination, an air fin type radiator within a convection casing which causes an air current through and away from the radiator, a valve within the casing controlling and supplying the heating medium to the radiator, thermostatic means mounted on said valve by insulating means, said thermostatic means being outside of and proximate to a thin convection casing wall and out of the path of the air currents within said radiator so that said thermostatic means is responsive to the temperature outside the said convection casing, said thermostatic means actuating said valve by means extending through said casing wall.

11. An automatically controlled heating unit, in combination, an air fin type radiator within a convection casing which causes an air current through and away from the radiator, a valve within the casing controlling and supplying the heating medium to the radiator, thermostatic means mounted on and actuating said valve, a thin convection casing wall partially interposed between said thermostatic means and said valve so as to render the thermostatic means responsive to the temperature outside the casing and uneffected by the air currents within the casing.

In witness whereof, I hereunto subscribe my name this 31 day of January, 1930.

REUBEN N. TRANE.